(12) United States Patent
Lee

(10) Patent No.: US 6,710,581 B1
(45) Date of Patent: Mar. 23, 2004

(54) CONSTANT-POWER BRUSHLESS DC MOTOR

(75) Inventor: I Soo Lee, Masan (KR)

(73) Assignee: I.S. Motor Korea Co., Ltd. (KR)

( * ) Notice: Subject to any disclaimer, the term of this patent is extended or adjusted under 35 U.S.C. 154(b) by 0 days.

(21) Appl. No.: 09/601,937

(22) PCT Filed: Feb. 9, 1999

(86) PCT No.: PCT/KR99/00069

§ 371 (c)(1),
(2), (4) Date: Aug. 10, 2000

(87) PCT Pub. No.: WO99/41829

PCT Pub. Date: Aug. 19, 1999

(30) Foreign Application Priority Data

Feb. 11, 1998 (KR) ................................................. 98/3917

(51) Int. Cl.⁷ ............................. H02P 3/08; H02P 5/06; H02K 7/00
(52) U.S. Cl. .......................... 322/39; 318/254; 310/680
(58) Field of Search ........................ 310/68 B; 318/254, 318/184, 439, 720–724, 293; 322/28, 39

(56) References Cited

U.S. PATENT DOCUMENTS

| | | | | | |
|---|---|---|---|---|---|
| 2,903,610 | A | * | 9/1959 | Bessiere ..................... | 310/254 |
| 3,610,978 | A | * | 10/1971 | Hermann ..................... | 310/105 |
| 4,638,224 | A | * | 1/1987 | Gritter ........................ | 318/254 |
| 4,723,100 | A | * | 2/1988 | Horikawa et al. .......... | 318/254 |
| 4,730,150 | A | * | 3/1988 | Lee et al. ................... | 318/254 |
| 4,801,832 | A | * | 1/1989 | Neumann ................... | 310/184 |
| 4,882,524 | A | * | 11/1989 | Lee .............................. | 318/254 |
| 5,216,339 | A | * | 6/1993 | Skybyk ....................... | 318/254 |
| 5,309,078 | A | * | 5/1994 | Cameron .................... | 318/811 |
| 5,642,009 | A | * | 6/1997 | McCleer et al. ............ | 310/156 |
| 5,669,063 | A | * | 9/1997 | Brockel et al. ............. | 455/506 |
| 5,751,089 | A | * | 5/1998 | Stridsberg ................... | 310/266 |
| 5,856,995 | A | * | 1/1999 | Morris ........................ | 372/87 |
| 5,866,959 | A | * | 2/1999 | Le Flem ..................... | 310/51 |
| 5,982,067 | A | * | 11/1999 | Sebastian et al. .......... | 310/184 |
| 6,087,654 | A | * | 7/2000 | Durham, III ........... | 250/231.13 |
| 6,097,127 | A | * | 8/2000 | Rivera ........................ | 310/184 |
| 6,288,471 | B1 | * | 9/2001 | Kometani et al. ......... | 310/193 |
| 6,304,045 | B1 | * | 10/2001 | Muszynski ................. | 318/439 |
| 6,359,401 | B1 | * | 3/2002 | Garcia-Sinclair et al. ... | 318/138 |

FOREIGN PATENT DOCUMENTS

JP      361058452 A   *   3/1986

* cited by examiner

Primary Examiner—Thomas M. Dougherty
Assistant Examiner—Julio C. Gonzalez
(74) Attorney, Agent, or Firm—Straub & Pokotylo; John C. Pokotylo (57) ABSTRACT

A constant-power brushless DC motor is provided, including a stator which is wound in parallel by phases and polarities and configured of n multi-phases, a rotor having a predetermined number of polarities, which is required to concentrate magnetic flux on its area, a commutation encoder including sensing regions and nonsensing regions, and two photo sensors set to each phase, the two photo sensors being connected to a controller, to excite only (n-b) phases among n phases, starting and rotating the motor, thereby realizing a constant-power DC motor without commutator, which is effective in energy saving, has good characteristic of continuous speed conversion and compact configuration.

7 Claims, 10 Drawing Sheets

VELOCITY ENCODER

COMMUTATION ENCODER

FIG.7A (8-3)PHASE EXCITING

FIG.7B (8-5)PHASE EXCITING

FIG.8

CONSTANT-POWER BRUSHLESS DC MOTOR

TECHNICAL FIELD

The present invention relates to a new motor system, and in particular, to a constant-power brushless DC motor, which is effective in energy saving, has good characteristic of speed conversion from a low speed to a high speed, has no torque ripple, produces high power with a low voltage, has excellent stable speed characteristic and high efficiency, has compact configuration not to require a cooling system, and is able to be fabricated in full automation with low production cost.

BACKGROUND ART

A conventional DC motor has problems that its brush and commutator are worn with the lapse of time, its configuration is complicated, and requires a high production cost. Especially, it is difficult to obtain a high speed of above 6000 rpm using a conventional power motor. With an AC inverter motor, its start torque is weak, controller needs high cost, and constant-power cannot be produced. Furthermore, a reluctance motor is inferior to other motors in terms of fabrication cost, size and weight, and does not produce constant-power. In general, a brushless DC. motor is widely used as a small-sized motor. However, it is difficult to fabricate the surface of permanent on which a rotor is set, its controller carries out four-quadrant control, requiring high cost, and constant-power cannot be produced. Moreover, the brushless DC motor cannot completely solve problems of nonuniform rotation, torque ripple and heat generation.

DISCLOSURE OF INVENTION

Accordingly, the present invention is directed to a constant-power brushless DC motor that substantially obviates one or more of the problems due to limitations and disadvantages of the related art.

An object of the present invention is to provide a constant-power brushless DC motor, which has no torque ripple, produces high power with a low voltage, has excellent stable speed characteristic and high efficiency, has compact configuration not to require a cooling system, and is able to be fabricated in full automation with low production cost.

To accomplish the object of the present invention, there is provided a constant-power brushless DC motor, including: a stator which is wound in parallel by phases and polarities and configured of n multi-phases, each of the winding coils of the stator which are not connected with one another is connected to each of n full H-bridges, n full H-bridges are connected to a DC power supply in parallel; a rotor having a predetermined number of polarities, which is required to concentrate magnetic flux on its area; a commutation encoder including sensing regions and nonsensing regions, the commutation encoder being externally set to one side of the shaft of the rotor; and two photo sensors set to each phase, the two photo sensors being connected to half H-bridge of each phase, to turn on/off the half H-bridge, the distance between the sensing regions of the commutator encoder is determined to allow a phases among n phases to be excited all the time, the a photo sensors recognizing the a phases excited.

It is preferable that the stator has narrow slots to remove cancel phenomenon. The number of phase among the n phases, which will be excited, is determined by the distance between the sensing regions, the distance between the sensing regions being determined through the following expression, distance between sensing regions=(2Π×number of phases to be excited)/(number of polarities of rotor×number of phases of motor) (°)

the number of sensing regions in the commutation encoder being determined through the following expression, number of sensing regions=(number of polarities of rotor)/2 the distance between the photo sensors on a sensor plate being determined by the following expression, distance between photo sensors=2ø/(number of polarities of rotor× number of phases of motor) (°)

among the n phases, a phases being excited but b phases not being excited all the time. It is preferable that $b \geq 1$, b corresponding to the number of phases inexcited.

The constant-power brushless DC motor of the present invention, which has multi-phases of 2, 3, 4, 5, 6, . . . , n phases, is configured of 1, 2, 3, 4, 5, . . . , a phases excited and 1, 2, 3, 4, 5, . . . , b phases inexcited, to alternate the excited phases and inexcited phases, being started and rotated. The rotor is configured of a permanent magnet, the stator is configured of independent winding in multi-phases, and the commutation encoder is externally fixed to one side of the shaft of the rotor to be rotated. The n phases include 2n sensors which are connected to the switching stage to sense the location of the rotor, indicating the direction and interval of current, thereby starting and rotating the motor. The stator, rotor, sensors and controller are constructed to be automatically fabricated, reducing the manufacture cost.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings.

The configuration of the constant-power brushless DC motor according to the present invention is explained below. Its stator, configured of n phases, is connected to the electronic commutator in parallel, each phase being independently wound. The rotor configured of a permanent magnet has a predetermined number of polarities of 2, 4, 6, 8, . . . to meet the design of the stator. The commutation encoder has a cylindrical shape constructed in such a manner that a ring-shape plate is mounted on the edge of a round-shape plate. The encoder includes a sensing region sensed by a photo sensor and nonsensing region, the sensing region being formed by cutting the ring-shape plate to excite (n-b) phases. That is, the sensing region allows a phases among the n phases to be excited all the time.

With the photo sensor, each phase has two photo sensors which operate in accordance with the commutation encoder. One photo sensor and the other photo sensor of one phase are placed in the angle of space between polarities of the rotor, being separated from each other. The photo sensors of each phase are sequentially arranged on the angle of space between phases. With the electronic commutator, each coil having multi-phases is connected to a predetermined number of full H-bridge, corresponding to the number of phases, and each of the two photo sensors of each phase is connected to a half H-bridge. The electronic commutator and each H-bridge are connected to power supply in parallel. According to the aforementioned configuration, the present invention accomplishes the constant-power brushless DC motor having continuous speed conversion and uniform efficiency.

Figure 1:
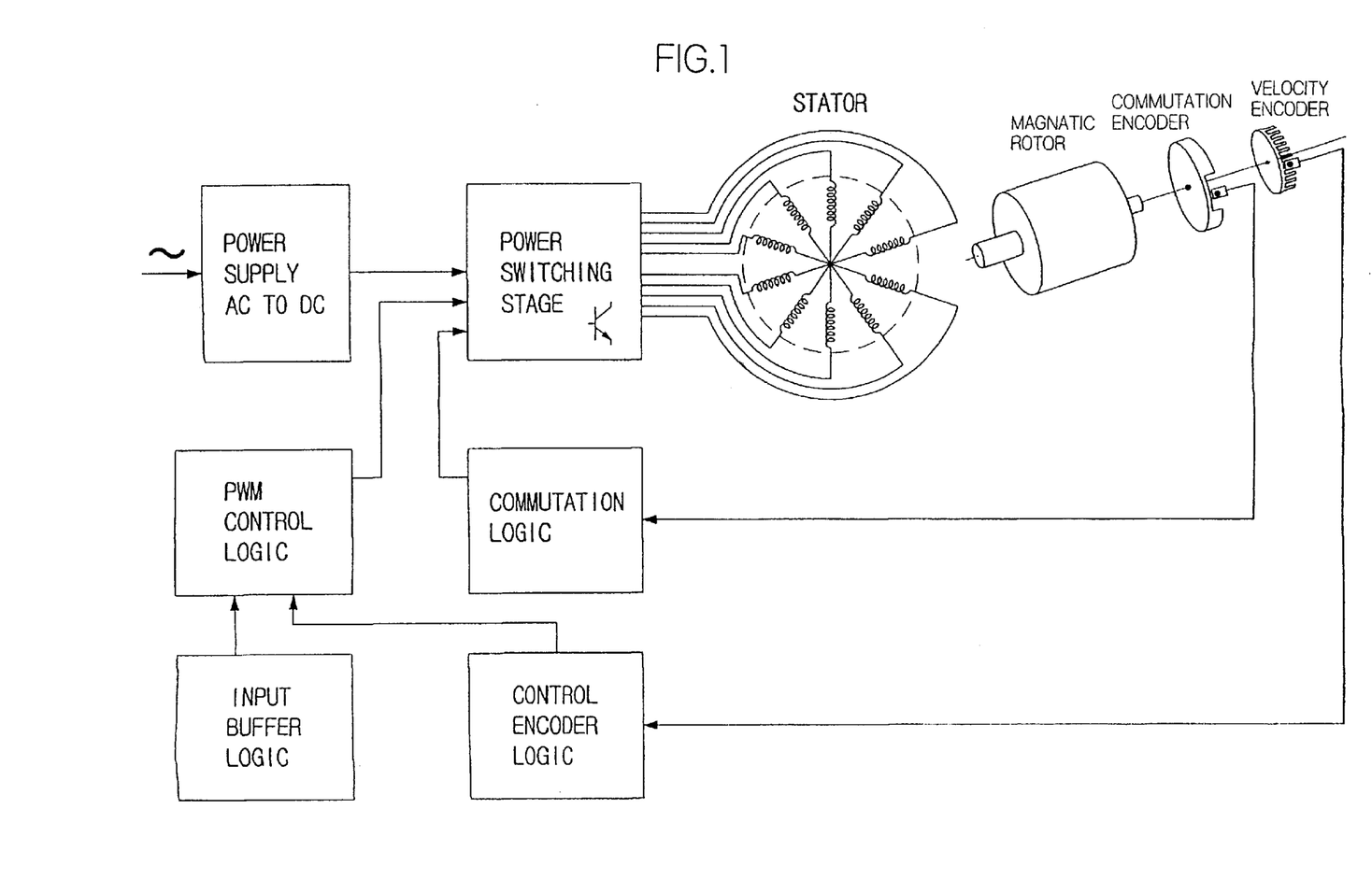
FIG. 1 is a block diagram of a constant-power brushless DC motor according to the present invention.

FIG. 1 is a block diagram of the constant-power brushless DC motor according to the present invention, which shows 5-phase stator, rotor, commutation encoder and control encoder which construct the rotor (stator and rotor), controller and power supply system. For open loop operation, the motor is controlled by only pulse width modulation control without employing the control encoder or control encoder logic. For closed loop operation, the control encoder, control encoder logic and input buffer logic are compared with the pulse width modulation control logic, performing speed control or location control with pulse width modulation. The motor is controlled by only pulse width modulation without using variable frequency control or vector control, resulting in easy control of motor and simple circuit configuration.

Figure 2A:
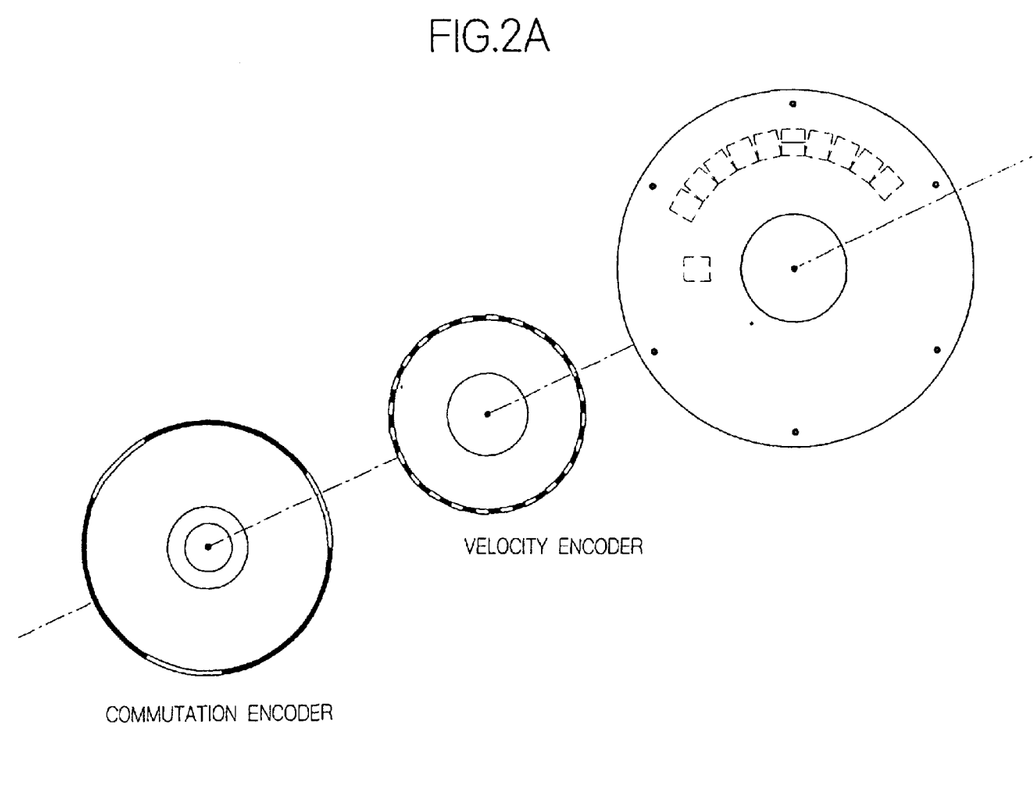
FIG. 2A illustrates the back of photo sensor of the constant-power brushless DC motor according to the present invention.
Figure 2B:
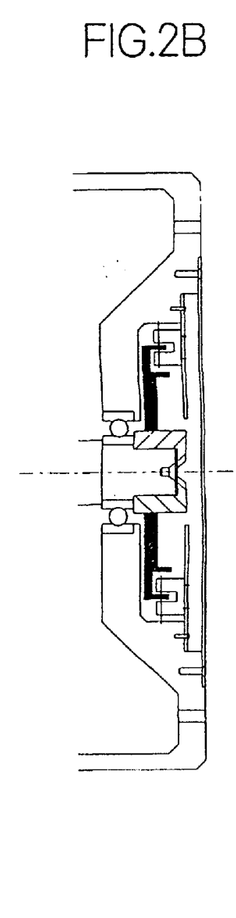
FIG. 2B is a cross-sectional view of the sensor of FIG. 2A.

FIGS. 2A and 2B illustrate the sensor of 5-phase 6-polarity motor. The commutation encoder and control encoder are externally fixed on one side of the shaft of the rotor placed outside the bracket on the back of the rotor, being rotated with the rotor. The sensor board on which the photo sensors are placed is set on the circumference of the bracket. The sensor board is adjusted to be set to allow advanced commutation. The control encoder is constructed in a manner that openings(or slots) are formed in desired portions of the ring-shape plate to allow the photo sensor to emit pulses, as shown in FIGS. 1 and 2A. Here, the size of the trenches and partition angle between them depend on the characteristics of speed control or location control of the motor.

Figure 3A:
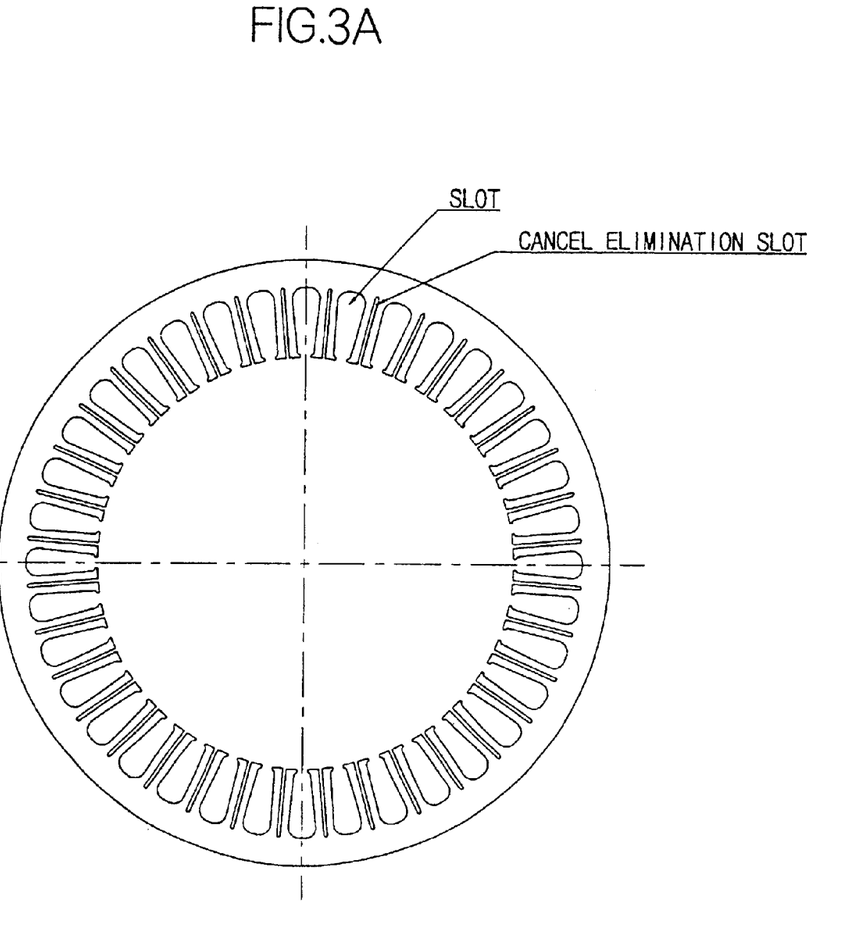
FIG. 3A illustrates cancel eliminated slots for removing the cancel phenomenon of magnetic flux of armature.
Figure 3B:
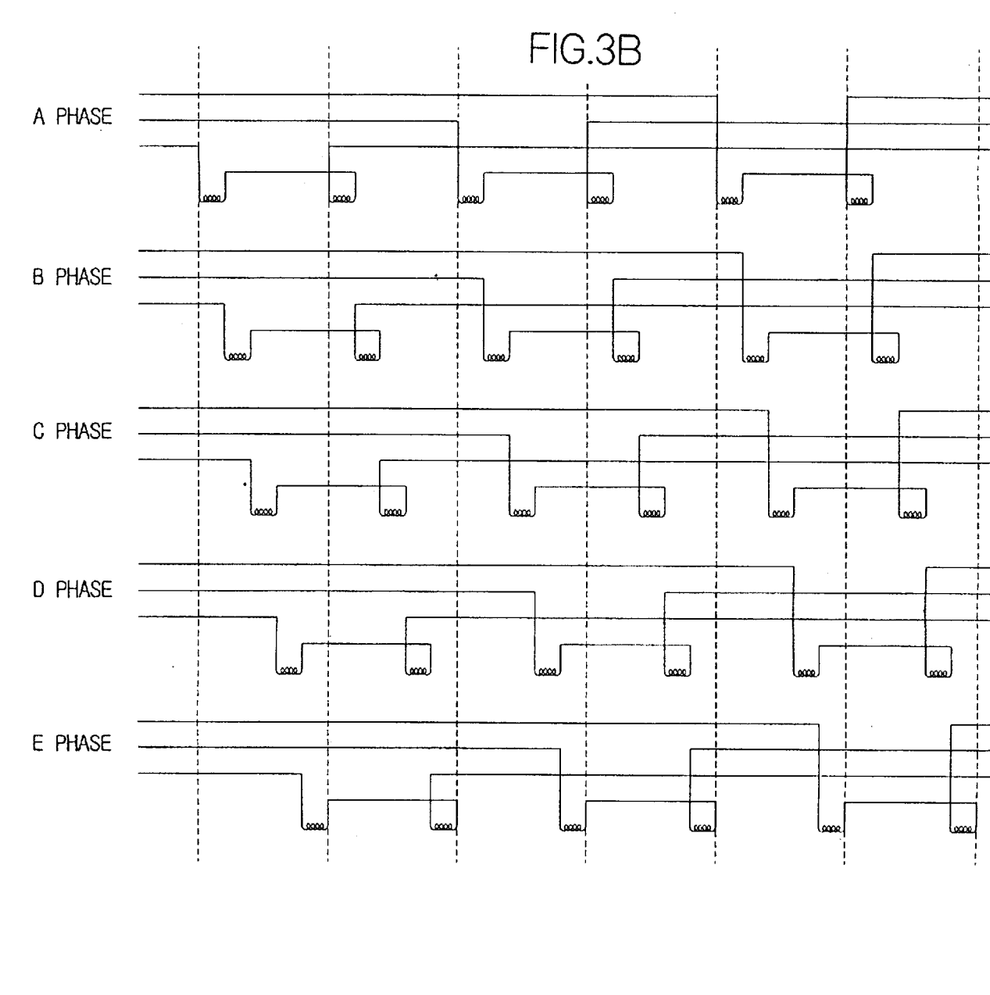
FIG. 3B illustrates stator winding of 5-phase 6-polarity motor.
Figure 4A:
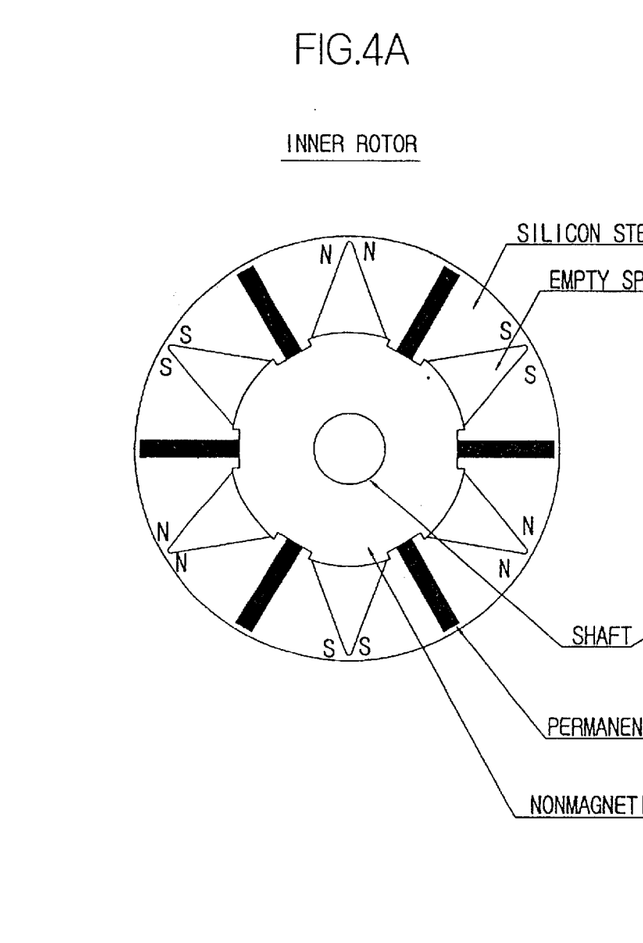
FIG. 4A illustrates 6-polarity inner rotor with bar permanent magnet inserted in laminated silicon (steel) plate.
Figure 4B:
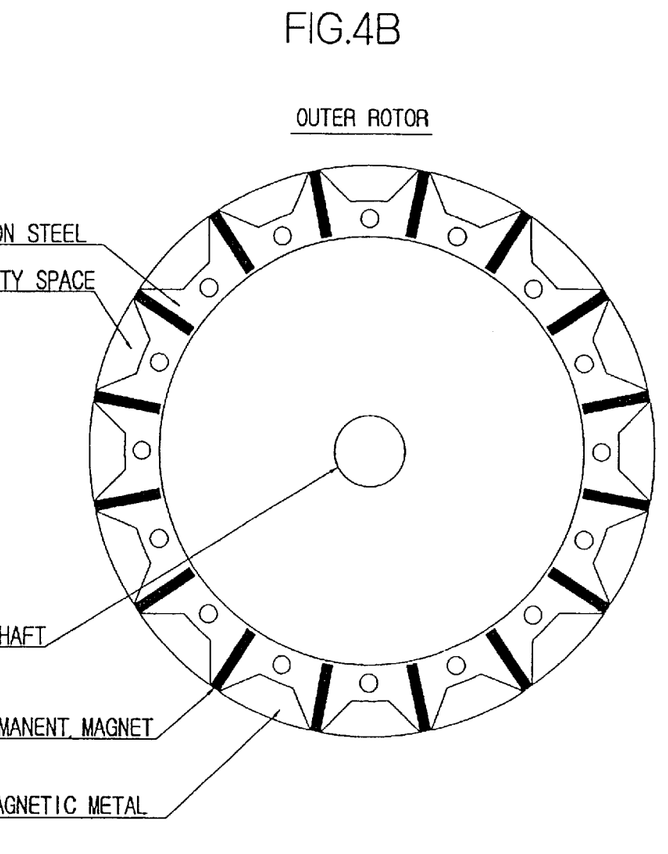
FIG. 4B illustrates 16-polarity outer rotor with bar permanent magnet inserted out of laminated silicon (steel) plate.
Figure 4C:
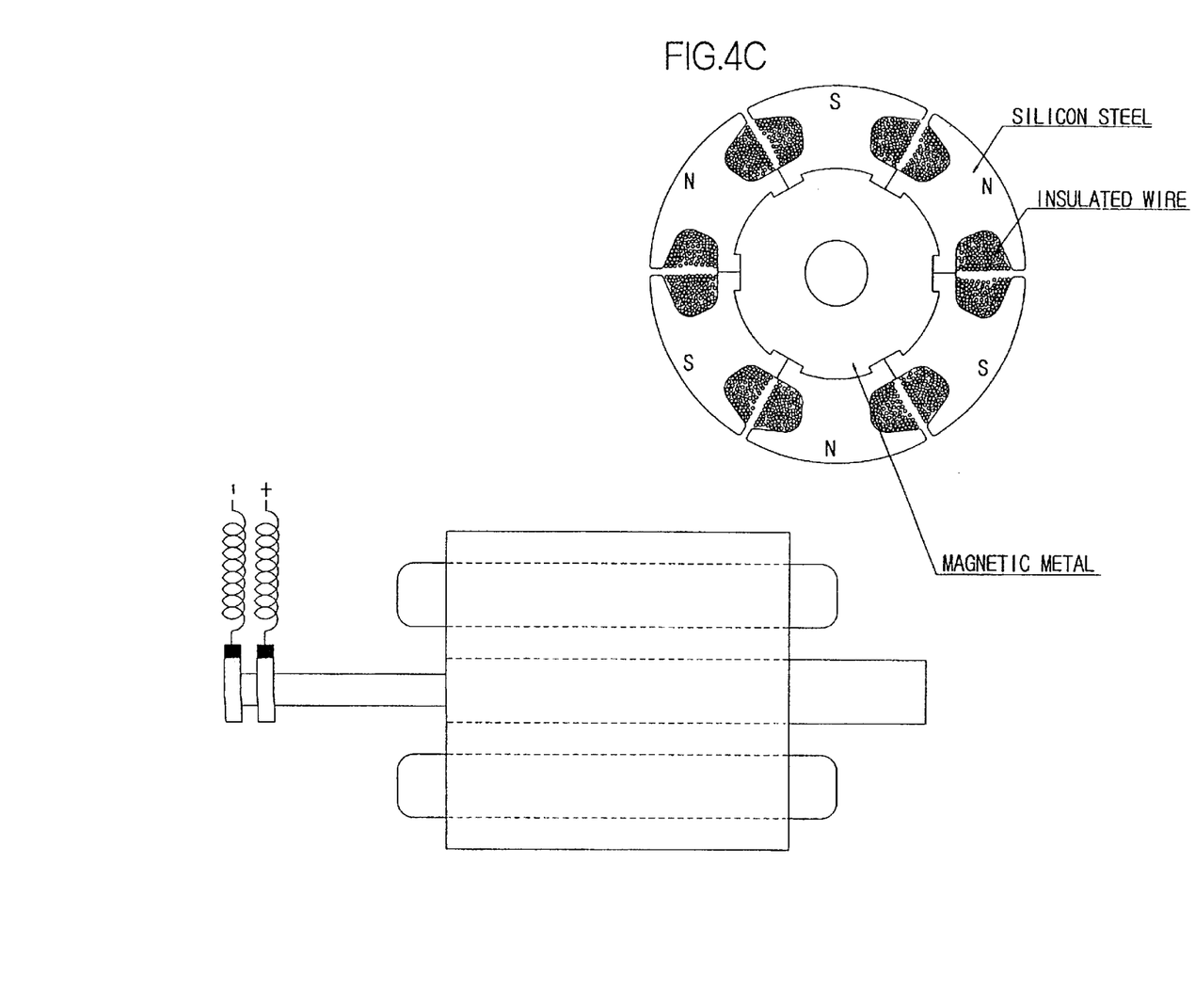
FIG. 4C illustrates slip ring of 6-polarity electro-magnet rotor.

FIG. 3A illustrates the wrought silicon (steel) plate (or laminated plate) of 5-phase 6-polarity typed stator, constructed in such a manner that narrow slots are formed between winding slots. FIG. 3B illustrates the winding of the 5-phase 6-polarity stator. Each of five phases is independently wound in parallel, being wound in parallel for each polarity, constructing the stator. FIG. 4A illustrates a 6-polarity permanent magnet rotor. Referring to FIG. 4A, a bar type permanent magnet is inserted into laminated silicon (steel) plate which is combined with the dove tail type holder of non-magnetic hub, constructing the rotor. FIG. 4B illustrates the external rotor pan-cake type permanent magnet rotor, and FIG. 4C illustrates a slip ring type electromagnet rotor.

Figure 5A:
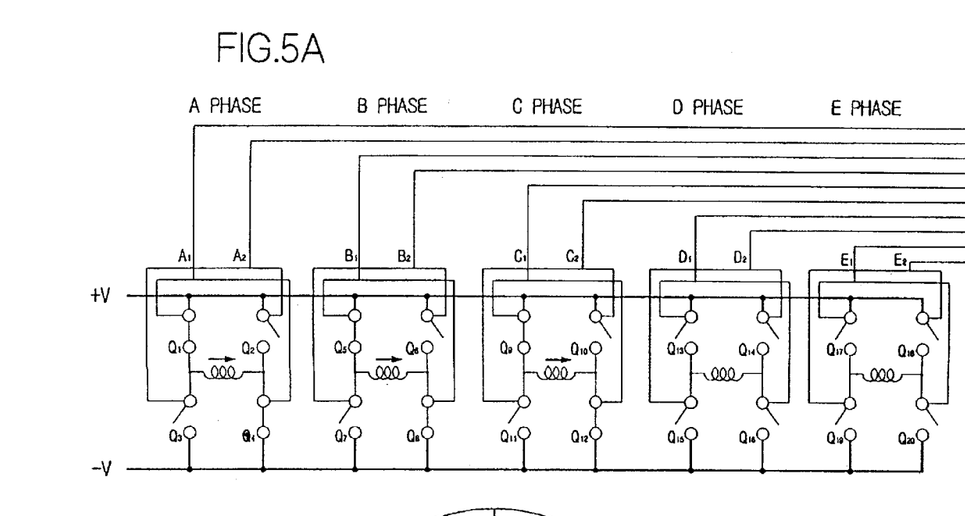
FIG. 5A illustrates driving circuit of 5-phase motor.
Figure 5B:
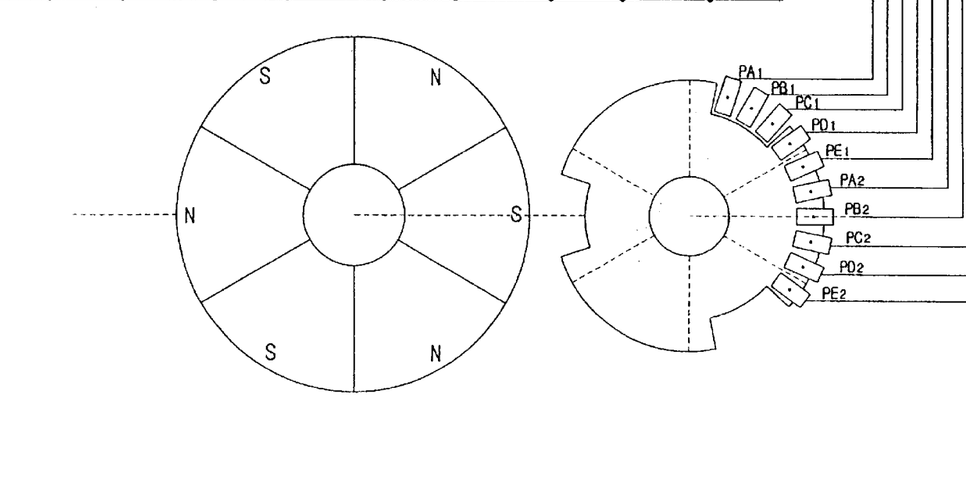
FIG. 5B illustrates that the commutation encoder and photo sensors of 5-phase 6-polarity motor are set on the rotor.

FIGS. 5A and 5B illustrate the electronic commutator circuit of 5-phase 6-polarity motor. In configuration of the commutation encoder, the number of sensing regions, that is, light emission recognition parts, is determined according to the following expression.

The number of sensing regions=the number of polarities of rotor/2

Accordingly, the number of sensing regions in the 5-phase 6-polarity motor shown in FIG. 5 corresponds to 3. The width (angle of shaft) of sensing region is determined by the following expression.

The width of sensing region={2Π/(number of polarities×number of phases)}×number of phases to be excited(0)

Accordingly, with the 5-phase 6-polarity motor shown in FIG. 5, only three phases are excited to make the angle of shaft of sensing region 36°. Referring to FIGS. 5A and 5B, $PA_1$, connected to Q1 and Q4 of half bridge whose one phase is excited and $PA_2$ connected to Q2 and Q3 of another half bridge whose one phase is excited are located at the same position of different polarities. Thus, when the circuit is electrified, $PA_1$, of one phase is located in the sensing region to emit positive pulse, turning on half bridge Q1 and Q4 of FIG. 5A. This make the coil electrifying, and the coil looped by Q1 and Q4 is excited. While the rotor rotates, turning-on interval of half bridge Q1 and Q4 is identical to the width of the sensing region of the commutation encoder. That is, excitation interval of half bridge Q1 and Q4 corresponds to shaft angle of 36°.

When the shaft angle is next 24° (60°–36°), $PA_1$ and $PA_2$ are placed in nonsensing region, turning off Q1, Q4, Q2 and Q3 of one-phase half bridge. Then, $PA_2$ like as $PA_1$ turn on Q2 and Q3 according to rotation of the commutation encoder, to allow one phase to independently become electrified, starting the rotor. The photo sensors are set on the sensor plate of FIG. 5B, having interval of 2Π/(number of polarities×number of phases) (°). In FIG. 5B, for example, ten photo sensors are arranged, having the interval of 12°.

The interval between two photo sensors of each phase corresponds to 2Π/(number of polarities of rotor). Thus, the distance between $PA_1$ and $PA_2$ is 60°.

As shown in FIGS. 5A and 5B, three phases are excited but two phases are inexcited all the time in 5-phase 6-polarity motor. Accordingly, excitation interval and inexcitation interval of each phase are determined by the following expressions.

Excitation angle=Π×(number of excited phases)/(number of phases) (°)

Inexcitation angle=Π×(number of inexcited phases)/(number of phases) (°)

Thus, the excitation angle and inexcitation angle of each phase of FIG. 5 are 108° and 72°, respectively.

Figure 6:
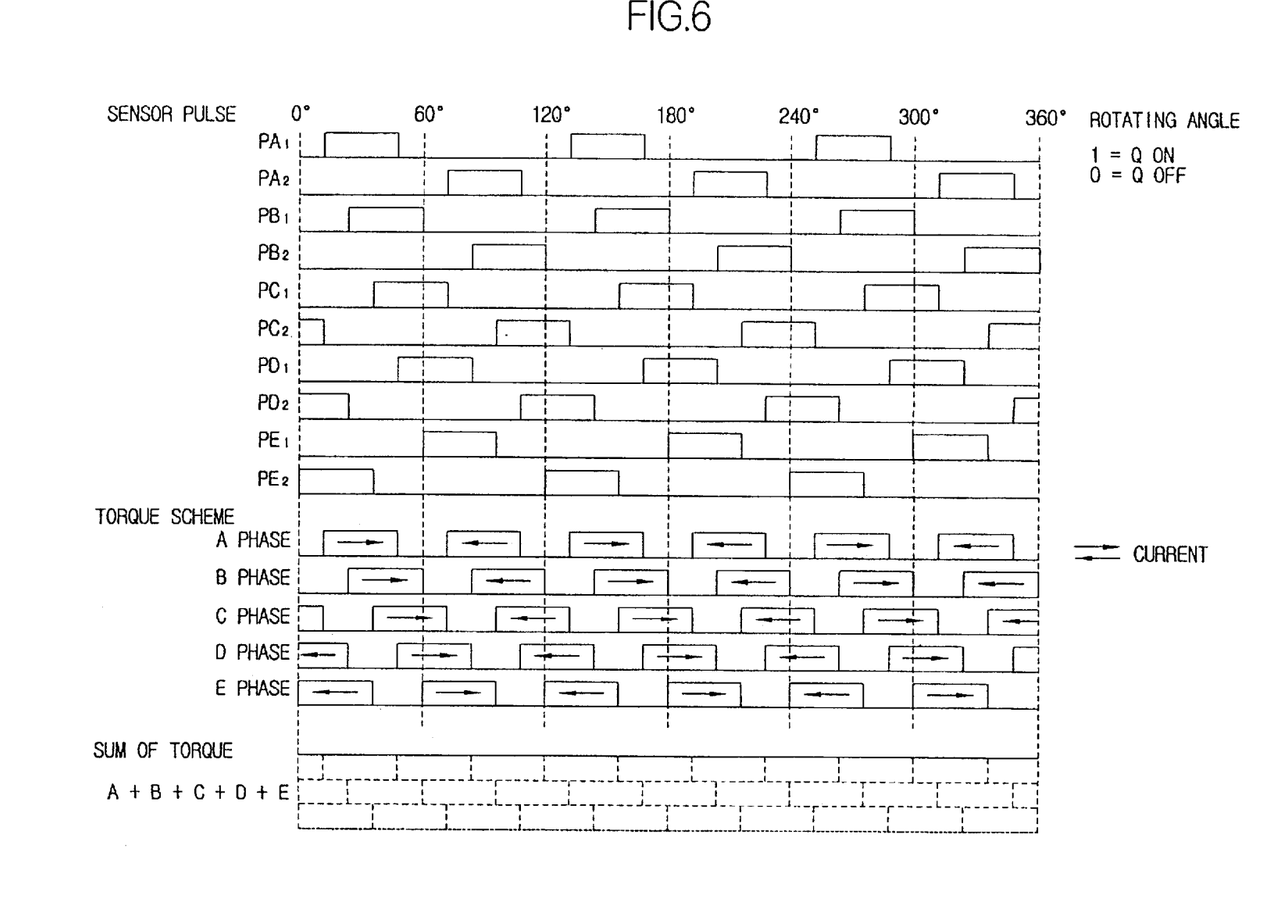
FIG. 6 illustrates torque generated when three phases are excited in 5-phase 6-polarity motor.

FIG. 6 shows pulse output of each photo sensor, direction of current input and delineation and interval of torque of 5-phase 6-polarity motor. The coil becomes electrified with current having the interval identical to the pulse transmitted by each photo sensor depending on the distance between the sensing regions of the commutation encoder, resulting in generation of torque. Thus, square and partial current wave is inputted and power of scheme of rectangular torque is outputted. Accordingly, three phases are excited and two phases are inexcited all the time in 5-phase 6-polarity motor shown in FIG. 5. Consequently, the sum total of torque corresponds to linear torque scheme.

As shown in FIGS. 5 and 6, the number of phases of the motor, which will be excited, depends on the distance between the sensing regions of the commutation encoder. The motor of the present invention solves all problems which occur in pole changing area. Specifically, the motor of the present invention is constructed in a manner that more than one of multi-phases are not excited to produce advanced commutation, resulting in smooth high-speed rotation.

Figure 7A:
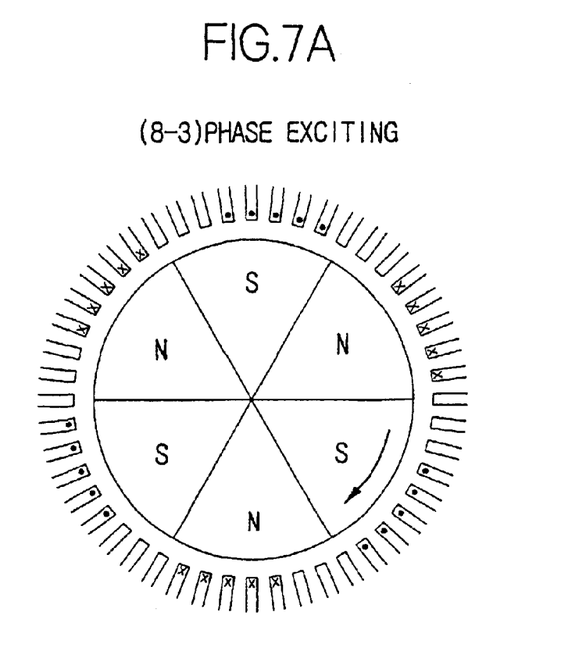
FIG. 7A illustrates that the distance corresponding to three phases is advanced-commutated in 8-phase 6-polarity motor.
Figure 7B:
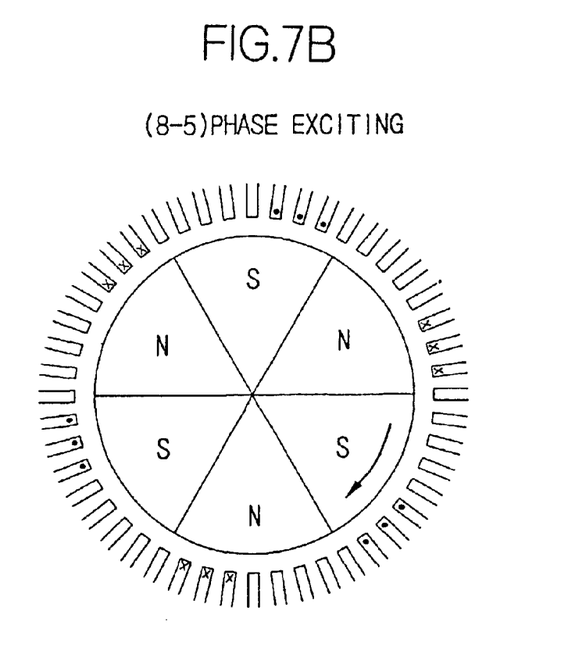
FIG. 7B illustrates that the distance corresponding to five phases is advanced-commutated in 8-phase 6-polarity motor.

In the process of converting electric energy into mechanical energy by the motor, timing that the stator coil is electrified to be excited to allow active-magnetic flux to generate magnetic motive force is delayed from timing that passive magnetic flux of rotor which rotates in high speed is operated. Accordingly, advanced commutation is required to make the timings coincide with each other. FIG. 7A illustrates 8-phase 6-polarity motor in which only five phases are excited and the distance corresponding to three phases inexcited is advanced-commutated. FIG. 7B illustrates 8-phase 6-polarity motor in which three phases are excited and the distance corresponding to five phases inexcited is advanced-commutated. The motor of FIG. 7A can be rotated faster than the motor of FIG. 7B.

Furthermore, in construction of very high-speed motor, the commutation encoder logic performs electronic combination changing for each photo sensor together with advanced photo sensor depending on microprocessor, performing gradual advanced commutation to meet a desired speed.

Figure 8:
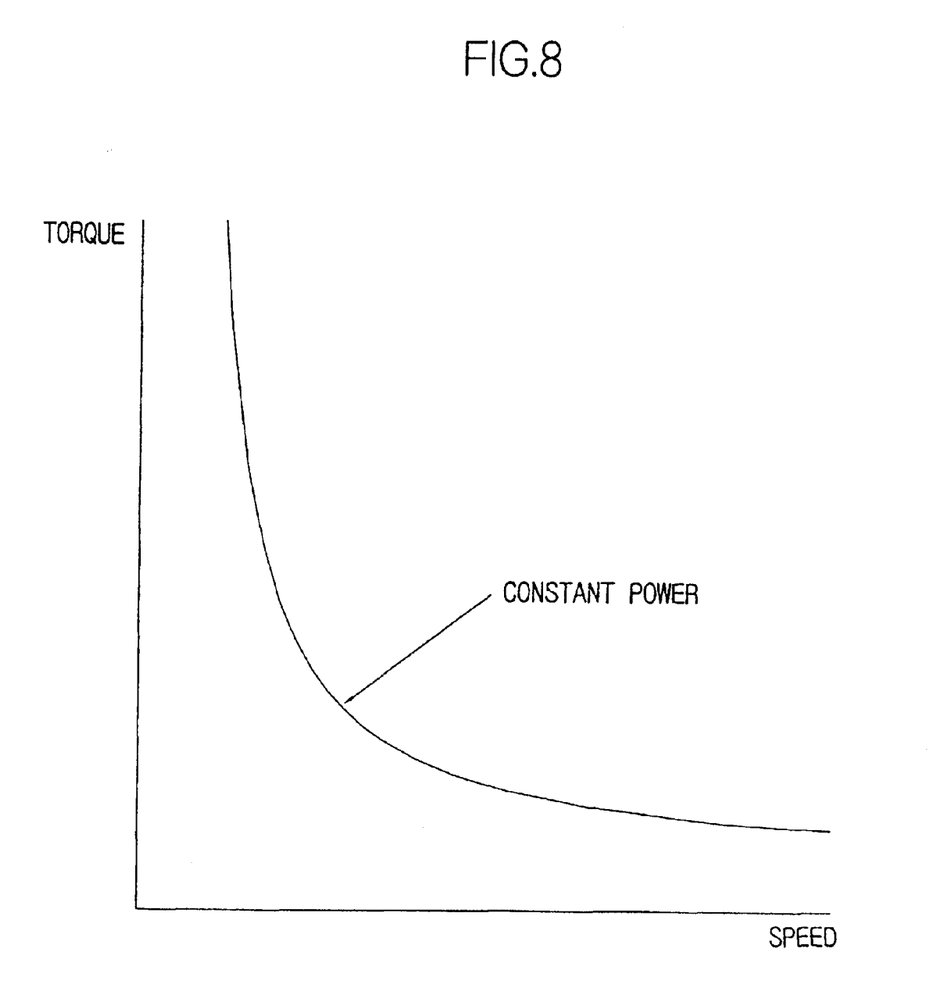
FIG. 8 illustrates constant-power characteristic of the constant-power brushless DC motor according to the present invention.

FIG. 8 illustrates the relationship between torque and speed of the constant-power brushless DC motor. As shown in FIG. 8, the DC motor of the present invention has constant-power characteristic. Furthermore, the DC motor of the present invention has CW and CCW capability and bidirectional operation. That is, when the commutation encoder logic in FIGS. 1 and 5 performs electronic combination changing for dual photo sensors included in each phase, the motor smoothly starts and rotates from forward direction to reverse direction or from reverse direction to forward direction. When electronic combination changing of photo sensor is carried out frequently within 5/1000 sec, bidirectional operation is easily activated. The DC motor of the present invention also has linear motor function. Specifically, ideal linear motor can be realized when the stator of motor is configured of linear type and its rotor is constructed to operate linearly.

According to the present invention, narrow slot of the stator removes collision of magnetic flux which is generated when the coil of each phase is electrified, improving the efficiency of the motor. There is no current loss and uniform electrification is carried out when the coil is in electrified, resulting in motor without torque ripple and controller with stability. Furthermore, the stator is parallel-wound by phases and polarities to allow the motor to produce a high power with a low voltage. The stator's parallel winding enables automatic production of motor, reducing the cost and making mass production possible.

Moreover, since magnetic flux is concentrated on the rotor area, passive magnetic flux of the rotor corresponds to active magnetic flux of the stator, realizing high-power motor using permanent magnet rotor. The surface of the rotor is machined to minimize empty space, improving the efficiency of the motor. Because there is no limitation in the number of polarity, size, shape of the rotor, long drum type or pan-cake type motor can be designed unrestrictedly for purposes. The rotor is assembled into the motor to allow automatic production, reducing the cost and enabling mass production.

Meanwhile, in commutation motors, motors using full sine wave or full square wave generate brake torque, back electromotive force(EMF), reactance (inductive reactance and capacitive reactance) and harmonic wave in pole changing area, so as to bring about iron loss and copper loss in the motor, impacting the controller. Furthermore, heat generates in the motor, to require cooling system and deteriorate its efficiency. However, the motor of the present invention does not apply current to the phase which is placed in pole changing area, to solve the above problems, eliminating necessity of cooling system and improving the efficiency of motor.

Moreover, partial square wave maximizes rms torque capacitance and peak torque value. Thus, the motor becomes compact and its efficiency is improved. Furthermore, The controller does not require cross fire prevention device, to simplify its circuit with stability, improving reliability and reducing the cost. The magnetic flux densities and permeability of the stator and rotor are identical because they are configured of the same material, silicon steel plate. Thus, characteristic of relation between current and torque is perfect, and characteristic of relation between current and speed is also excellent. This allows the motor to produce constant-power, resulting in uniform efficiency for all speed ranges.

The torque of conventional motor is sinusoidal torque scheme or trapezoidal torque scheme, causing torque ripple. The motor of the present invention applies partial square wave to the winding coil of each phase, to allow each phase to realize rectangular torque scheme, the total torque becoming linear torque scheme. Accordingly, the motor according to the present invention has no torque ripple and smoothly starts and rotates. Furthermore, with the constant-power brushless DC motor of the present invention, while b phases among n phases are inexcited, advanced commutation is performed for the distance corresponding to the b phases inexcited. Therefore, the present invention realizes the constant-power motor having continuous speed conversion and uniform efficiency. The motor carries out electronic neutral commutation according to the microprocessor, to perform smooth CW-CCW control, bidirectional control with high speed, and smooth position control.

It will be apparent to those skilled in the art that various modifications and variations can be made in the constant-power -brushless DC motor of the present invention without departing from the spirit or scope of the invention. Thus, it is intended that the present invention cover the modifications and variations of this invention provided they come within the scope of the appended claims and their equivalents.

What is claimed is:

1. A constant-power brushless DC motor, comprising:

a stator wound in parallel by phases and polarities and configured of n multi-phases, each of the winding coils of the stator which are not connected with one another is connected to each of n full H-bridges, n full H-bridges are connected to a DC power supply in parallel;

a rotor having a predetermined number of polarities, which is required to concentrate magnetic flux on excitation area;

a commutation encoder including sensing regions and nonsensing regions, the commutation encoder being externally set to one side of the shaft of the rotor; and two photo sensors set to each phase, the two photo sensors being connected to a half H-bridge of each phase, to switch the half H-bridge on and off, wherein the width of each of the sensing regions of the commutator encoder is determined to allow a phases among n phases to be excited constantly, the corresponding photo sensors recognizing the a phases excited, wherein the stator has narrow slots to remove flux cancel phenomenon between every winding slot and to remove peak current between said excited phase and said inexcited phase, and wherein the number of phases among the n phases, which will be excited, is determined by the distance between the sensing regions, the distance between the sensing regions being determined through the following expression, width of sensing regions=(2π×number of phases to be excited)/ (number of polarities of rotor×number of phases of motor) (°), the number of sensing regions in the commutation encoder being determined through the following expression, number of sensing regions=(number of polarities of rotor)/2, the distance between the photo sensors on a sensor plate being determined by the following expression, distance between photo sensors=2π/(number of polarities of rotor× number of phases of motor) (°), among the n phases, a phases being excited but b phases not being excited all the time.

2. The motor as claimed in claim 1, wherein b≧1, b corresponding to the number of phases inexcited.

3. A constant power brushless DC motor comprising:

a stator constituted by at least two phases, each of the phases having plurality of windings wound in a distributed, parallel, winding and being independently connected with the each H-bridge circuit of a power switching stage without inter-connection;

a rotor rotatably coupled to said stator and having an even plurality of permanent magnet poles, the motor having said permanent magnet rotor in which the magnetic arrangement is radial to the shaft and integral to said rotor laminations, said rotor laminations having empty spaces between every each magnet in said rotor; and a commutation encoder externally set to one side of the shaft of said rotor and having sensing regions and nonsensing regions, wherein the number of phases among the at least two phases, which will be excited, is determined by the distance of each sensing region, wherein the distance of said sensing regions being determined by the following formula:

| | n | total phases |
|---|---|---|
| 1, 2, 3, ... | a | excited phases, |
| 1, 2, 3, ... | b | inexcited phases |

$$\frac{2\pi}{\text{the number of poles in the rotor}} \times \frac{(n-b) \text{ phases}}{\text{the number of phases}} \text{(degrees)}$$

the number of said sensing regions is determined by the following formula:

$$\frac{\text{number of poles}}{2};$$

photo sensors positioned operatively with said commutation encoder and constituted so that two photo-sensors are provided with respect to each phase, each of said photo-sensors in the at least two phases being arranged, in turn, one by one at intervals of predetermined shaft angle so as to produce a positive pulse when registered with said sensing of said commutation encoder, and said interval in determined by the following formula:

$$\frac{2\pi}{\text{the number of poles in the rotor}} \times \frac{1}{\text{the number of phases}} \text{(degrees)};$$

an electronic commutator constituted such that an H-bridge in connected across the windings of each phase of said stator, a half H-bridge of each phase being connected to one photo-sensor so that each phase is provided with two photo-sensors so as to determine the current direction according to the positive pulse of the photo-sensors, thereby flowing the alternating current of part-square wave through the windings to drive the motor, and an electric power source connected in parallel to each phase of said electronic commutator.

4. The motor according to claim 3 wherein said stator has narrow slots adapted to eliminate flux cancel phenomenon between every winding slot and to remove peak current between said excited phase and said inexcited phase.

5. The motor according to claim 1 wherein n>b>1, n corresponding to the number of phases, b corresponding to the number of inexcited phases.

6. The motor according to claim 3 wherein n>b>1, n corresponding to the number of phases, b corresponding to the number of inexcited phases.

7. The motor according to claim 3 wherein constant power is delivered by the motor.

* * * * *